Jan. 28, 1969　　　R. A. GICONI　　　3,424,144
STONE CUTTING MACHINE
Filed May 12, 1967　　　　　　　　　　　Sheet 1 of 4

INVENTOR
RENELL A. GICONI

BY Cushman, Darby & Cushman
ATTORNEYS

Jan. 28, 1969       R. A. GICONI       3,424,144
STONE CUTTING MACHINE
Filed May 12, 1967                    Sheet 2 of 4

INVENTOR
RENELL A. GICONI
BY Cushman, Darby & Cushman
ATTORNEYS

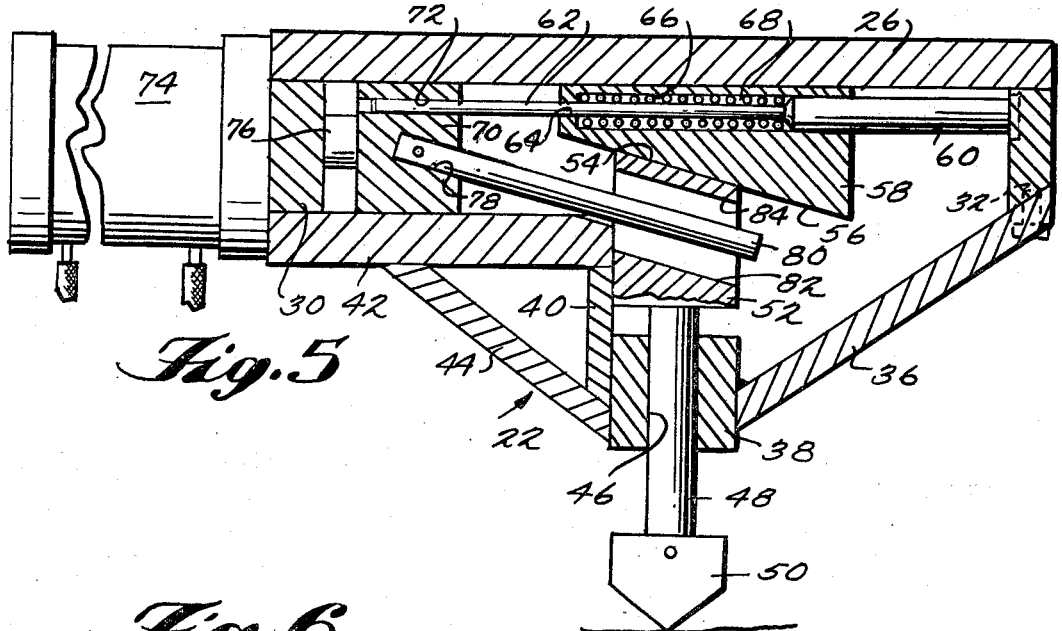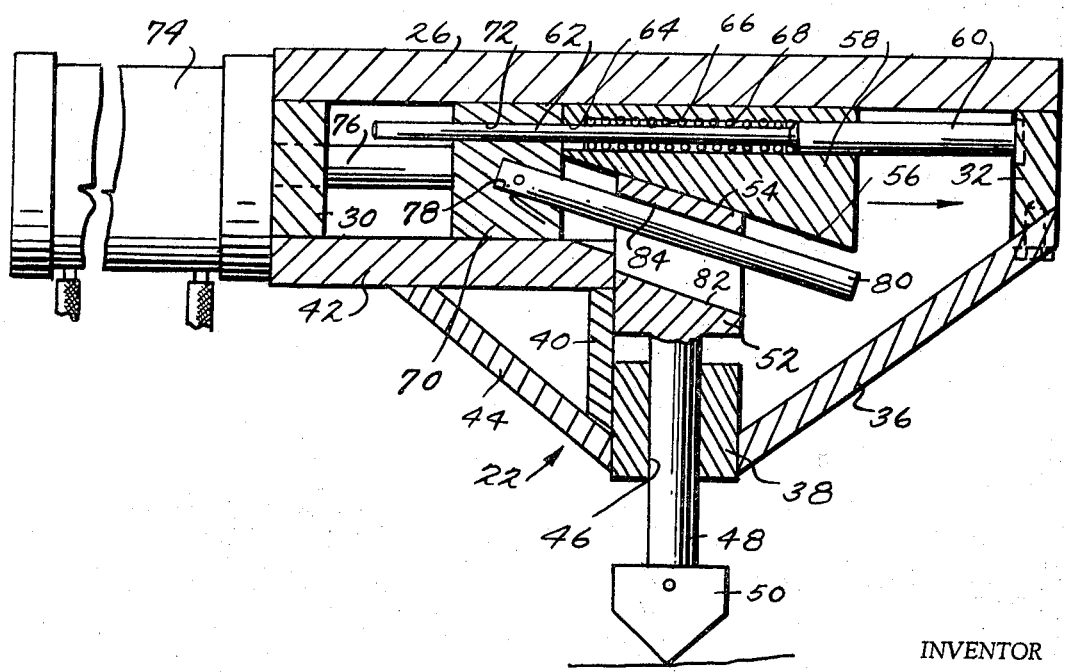

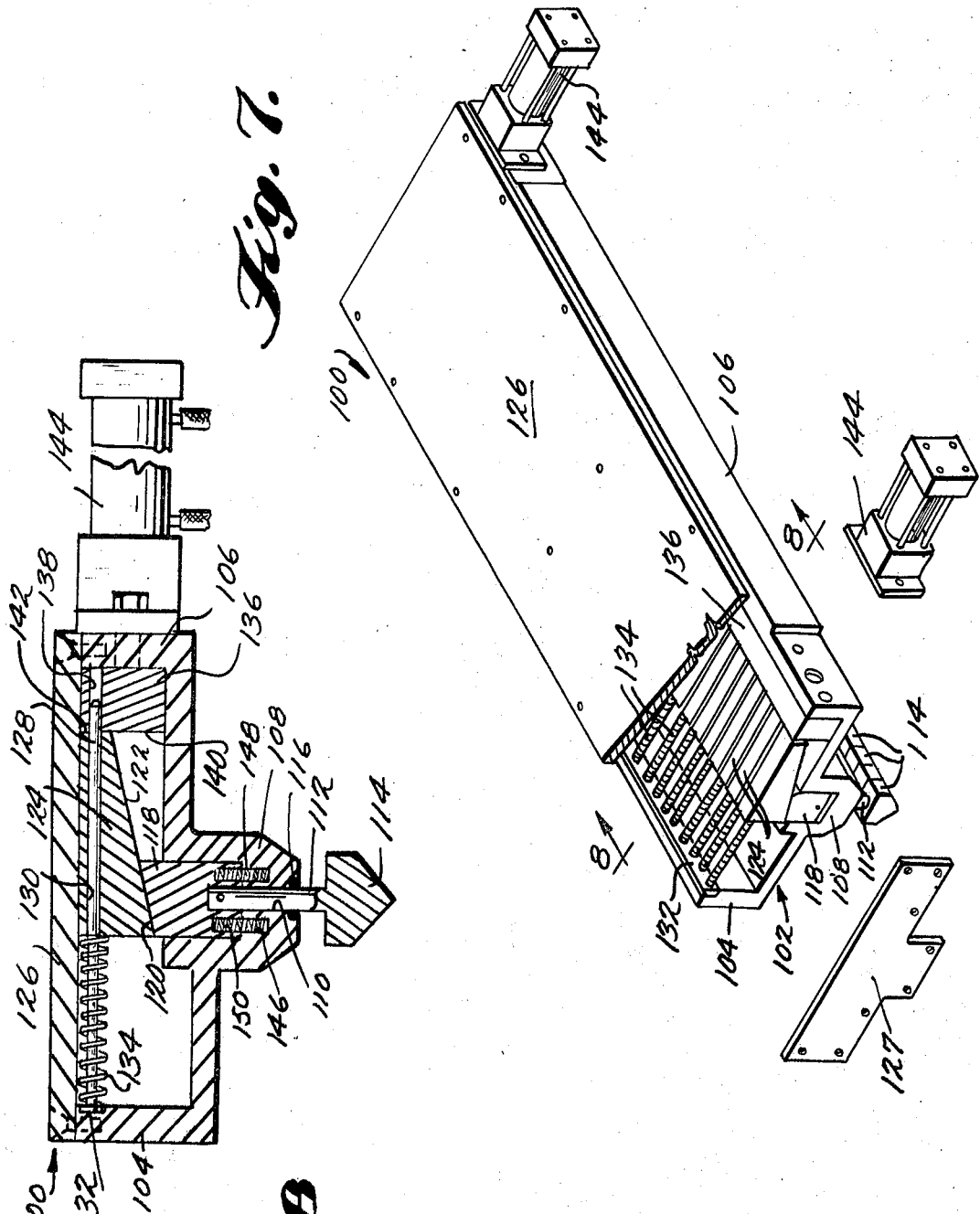

United States Patent Office 3,424,144
Patented Jan. 28, 1969

3,424,144
STONE CUTTING MACHINE
Renell A. Giconi, Grantsville, Md., assignor to Vaughn W. Crile, Canonsburg, Pa.
Continuation-in-part of application Ser. No. 400,401, Sept. 30, 1964. This application May 12, 1967, Ser. No. 648,516
U.S. Cl. 125—23    8 Claims
Int. Cl. B28d 1/30

ABSTRACT OF THE DISCLOSURE

A stone cutting machine having opposed cutting assemblies mounted for movement by a main hydraulic ram away from each other to receive a stone therebetween and toward each other to cut a stone disposed therebetween, each cutting assembly having a separate pair of hydraulic rams for moving a multiplicity of side-by-side cutting teeth through an operative stroke during which all of the cutting teeth are moved by spring forced wedge members movable along guide rods extending therethrough into contacting engagement with the opposed irregular surfaces of the stone prior to the cutting stroke, the cutting stroke being automatically sequently effected after contacting engagement of the teeth is accomplished and the cutting teeth of each cutting assembly being positively moved either through cooperating lost motion wedging surfaces or through springs into a retracted position through the return stroke of the hydraulic rams associated therewith simultaneously with the movement of the cutting assemblies apart by the main hydraulic ram.

---

This application constitutes a continuation-in-part of my copending application, Ser. No. 400,401, filed Sept. 30, 1964, now abandoned, for Stone Cutting Machine.

This invention relates to stone cutting machines and more particularly to improvements in the cutting assemblies of stone cutting machines.

There are several power operated stone cutting machines commercially available at the present time. In general, these machines embody a pair of opposed cutting assemblies which are movable toward and away from each other to effect the cutting action. Each cutting assembly includes a plurality of chisels or cutting teeth mounted for independent vertical movement in side-by-side relation and means is provided for bringing each of the teeth into rigid contact with the stone to be cut before the final cutting action takes place. In this way when the two cutting assemblies are moved together during the cutting stroke, the cutting pressure will be equalized with respect to all of the teeth. This tooth equalization is necessary in order to prevent any one tooth from becoming overloaded.

An example of a stone cutting machine of this type is illustrated in Entz United States Patent 2,762,359, dated Sept. 11, 1956. The machine disclosed in the Entz patent includes a base member and a head member each of which carries a cutting assembly, the base member being movable toward and away from the head member through suitable power operated means, such as hydraulic cylinders or the like.

In the operation of the machine disclosed in the Entz patent, a slab of stone is first fed between the cutting assemblies and then the base member is moved upwardly to engage the upper surface of the stone with the teeth of the upper cutting assembly and to effect a limited upward movement of the upper teeth so as to insure that all of these teeth are in contact with the irregular upper surface of the stone. After this upward movement of the base has taken place, the upper and lower cutting assemblies themselves are actuated so as to move an upper and lower series of wedges corresponding to the upper and lower cutting teeth into engagement with the teeth so as to insure that the upper teeth contacting the upper surface of the stone are rigid in an upper direction with respect ot the head member and so as to move the lower teeth into contact with the lower surface of the stone and provide a rigid contact between these teeth and the base member in a downward direction. After the cutting assemblies have been actuated to effect this equalized rigid securement of the teeth, the base member is then further moved upwardly to complete the cutting action.

An object of the present invention is to provide a stone cutting machine having an improved upper cutting assembly which is capable of materially reducing the time of operating cycle of the machine so as to materially increase its productivity.

Another object of the present invention is the provision of a stone cutting machine of the type described having an operating cycle of increased speed which is simple to operate and therefore capable of operation by relatively inexperienced operators with a minimum requirement of maintenance and repair.

In its broadest aspects, the present invention is based upon the proposition that the operating cycle of a stone cutting machine is greatly improved where the teeth of the cutting assemblies are brought into rigid contact with the upper and lower surfaces of the stone through a power operated mechanism which is independent of the power operated mechanism for effecting movement of the base and head members of the machine toward and away from each other. With such improved cutting assembly, the cutting stroke of the machine involves a simple two-step sequential operation which is susceptible of automatic operation, rather than a three-step sequential operation which presents difficulties in providing for automatic sequential operation.

Accordingly, it is an object of the present invention to provide a stone cutting machine in which the cutting stroke of the machine utilizes a simple two-step sequential operation which materially reduces the time required to effect the cutting stroke and which makes possible an automatic sequential stroke operation, thus reducing the amount of operational judgment required to operate the machine.

Still another object of the present invention is the provision of an improved cutting assembly for a stone cutting machine which is effective to actuate the cutting teeth of the assembly into rigid equalized contact with the stone surface prior to the completion of the cutting stroke.

Still another object of the present invention is the provision of an improved cutting assembly for a stone cutting which is simple and rugged in construction and easy to operate and maintain.

These and other objects of the present invention will become more apparent during the course of the following detailed description and appended claims.

The invention may best be understood with reference to the accompanying drawings wherein an illustrative embodiment is shown.

In the drawings:

FIGURE 5 is a view similar to FIGURE 4 showing the position of the parts when the cutting teeth are disposed in rigid contact with the stone just prior to the final cutting movement;

FIGURE 6 is a view similar to FIGURE 4 showing the position of the parts when the cutting teeth are being returned into their inoperative limiting position;

FIGURE 7 is a perspective view with certain parts exploded and broken away for purposes of clearer illustration of a cutting assembly of modified form embodying the principles of the present invention; and FIGURE 8 is an enlarged fragmentary cross sectional view taken along the line 8—8 of FIGURE 7.

Figure 1:
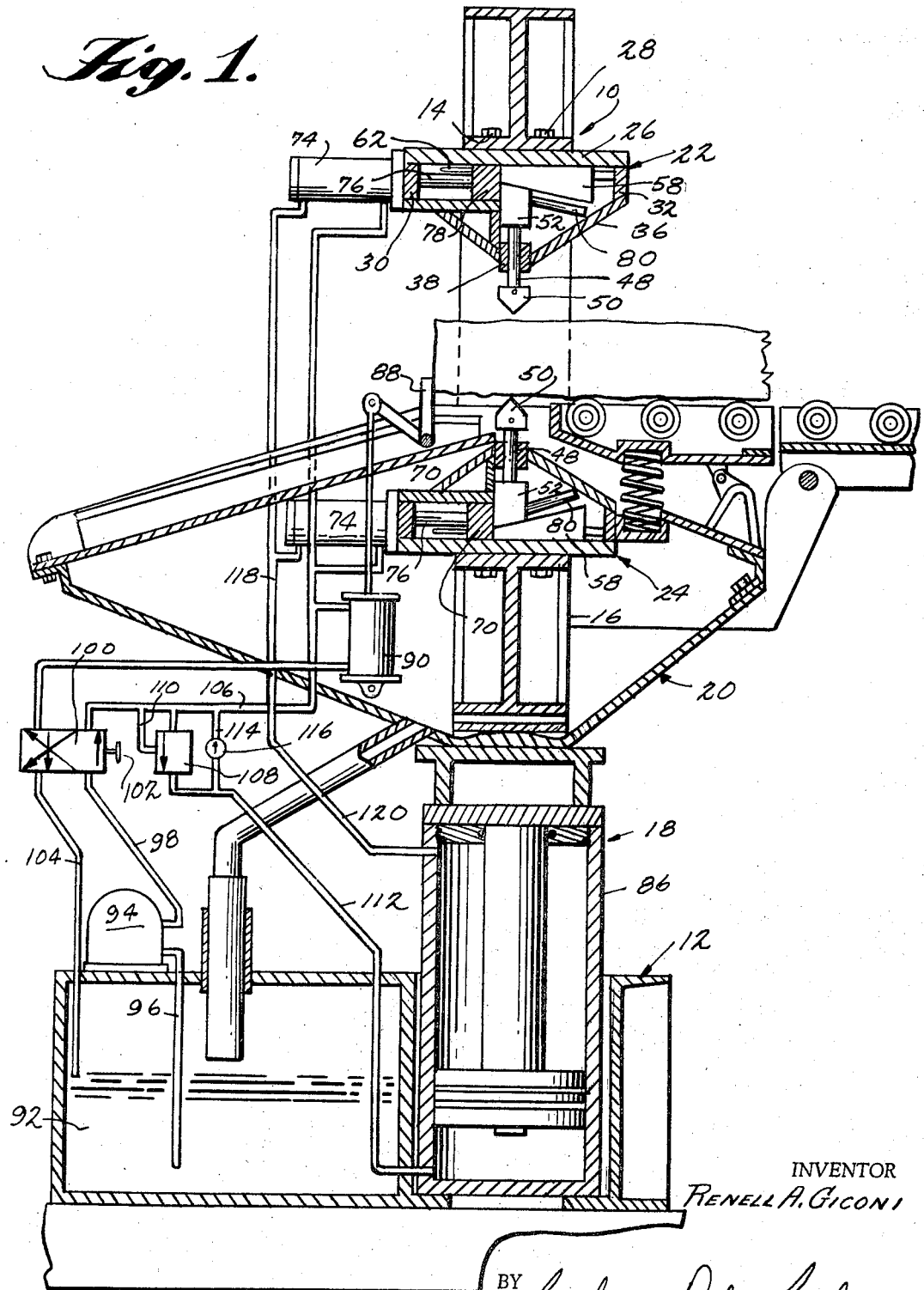
FIGURE 1 is a vertical sectional view of a stone cutting machine embodying the principles of the present invention, the various hydraulically operated components of the machine being shown in conjunction with a somewhat schematic hydraulic circuit.

Referring now more particularly to FIGURE 1, there is shown therein a stone cutting machine, generally indicated at 10, which embodies the principles of the present invention. In order to provide a specific example of the present invention, the machine 10 shown in FIGURE 1 is constructed in accordance with the machine illustrated in Entz U.S. Patent 2,762,359 with certain modifications. Consequently, the present description will concern itself mainly with these modifications and it will be understoood that where a more detailed description of the components of the machine is desired, reference may be had to the aforementioned Entz patent.

As shown, the machine 10 includes a rigid frame, generally indicated at 12, which is specifically constructed in the manner shown in the Entz patent. The frame includes a rigid upper head member 14 and a lower base member 16 which is mounted for vertical reciprocating movement in a position below the head member by a power operated base moving mechanism, generally indicated at 18. Rigidly secured to the base member 16 for vertical reciprocating movement therewith is a stone handling feed and discharge assembly, generally indicated at 20, which likewise is preferably constructed in a manner specifically disclosed in the aforesaid Entz patent.

Rigidly secured in depending relation to the upper head member 14 is a cutting assembly, generally indicated at 22, which is constructed in accordance with the principles of the present invention. Preferably, a similar lower cutting assembly, generally indicated at 24, is rigidly secured to the upper surface of the lower base member 16 in general vertical alignment with the assembly 22 for vertical reciprocating movement with the base member 16. While it is preferable to utilize a lower cutting assembly 24 which is of a construction substantially the same as the construction of the upper cutting assembly 22, it will be understood that a lower cutting assembly of the type disclosed in the Entz patent may be utilized in conjunction with the upper cutting assembly 22 and the advantages of the present invention can still be obtained.

Since the cutting assemblies 22 and 24 are of substantially identical construction, a description of the upper cutting assembly 22 will suffice to give an understanding of the construction and operation of both.

Referring now more particularly to FIGURES 2–6, the cutting assembly 22 comprises a frame construction which includes an upper horizontal frame member 26 which is adapted to be rigidly secured below the head member 14, by any suitable means, such as a series of bolts 28, as shown in FIGURE 1.

Fixedly secured to the side edges of the frame member 26 is a pair of side frame members 30 and 32 and a pair of end frame members 34 are fixedly secured to the end edges of the upper frame member 26 between the end edges of the side frame members 30 and 32. Extending downwardly and rearwardly from the lower edge of the front side frame member 32 in fixed relation therewith is a front bottom frame member 36, the lower edge of which is rigidly secured to the forward surface of an elongated block 38. The ends of the block are fixedly secured to the end frame members and the upper portion of the rearward surface thereof has a vertical frame plate 40 fixedly secured thereto, the upper edge of which is fixedly secured to the forward edge of a horizontal bottom frame plate 42. The rearward edge of the plate 42 is fixedly secured to the lower edge of the side frame member 30 between the end frame members. Preferably, a diagonal bottom frame plate 44 is fixedly secured at its forward edge to the forward lower edge of the block 38 and the lower edge of the vertical frame plate 40 and at its upper edge with the bottom surface of the horizontal bottom frame plate 42.

Figure 2:
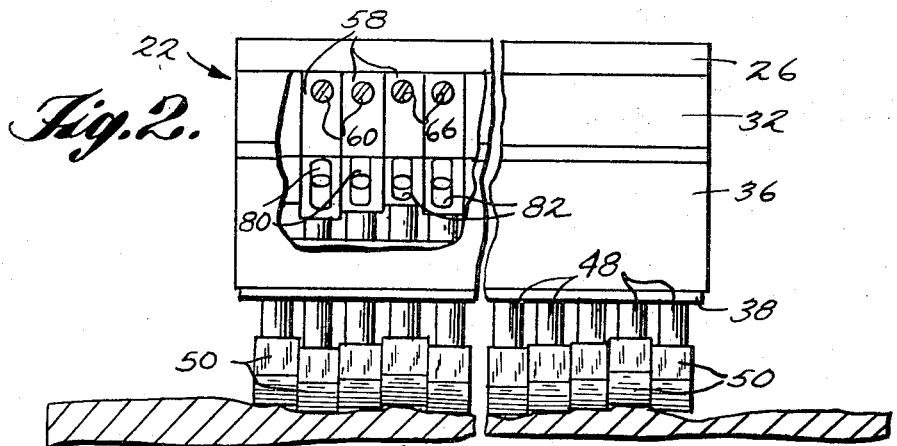
FIGURE 2 is an enlarged front elevational view of the upper cutting assembly, with parts broken away for purposes of clearer illustration.
Figure 3:
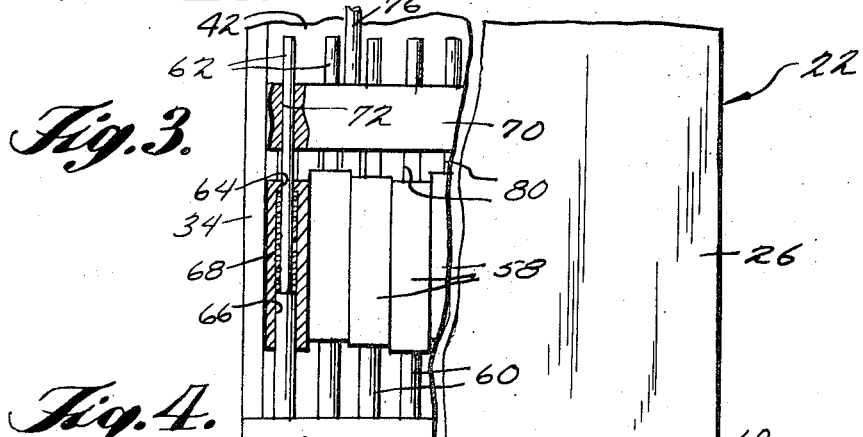
FIGURE 3 is a top plan view of the structure shown in FIGURE 2, with parts broken away for purposes of clearer illustration.

The block 38 has formed therein a series of parallel vertically extending openings or bores 46 within which are slidably mounted a series of vertically extending cutting tooth shanks 48. Each shank 48 has a chisel or cutting tooth of chisel-like configuration 50 fixedly mounted on the lower end thereof, the series of teeth being independently mounted in side-by-side relation, as best shown in FIGURE 2. Fixedly secured to the upper end of each shank 48 is a wedge member 52 having an upper wedge surface 54 which is adapted to engage a cooperating wedge surface 56 formed on the lower portion of a cooperating wedge member 58. It will be noted that the cooperating wedge surfaces 54 and 56 extend at an acute angle with respect to the horizontal plane so that an upward force acting on the teeth through the shanks 48 and wedge members 52 will not have a sufficient component in the horizontal direction to effect a horizontal movement of the associated wedge member 58.

Figure 4:
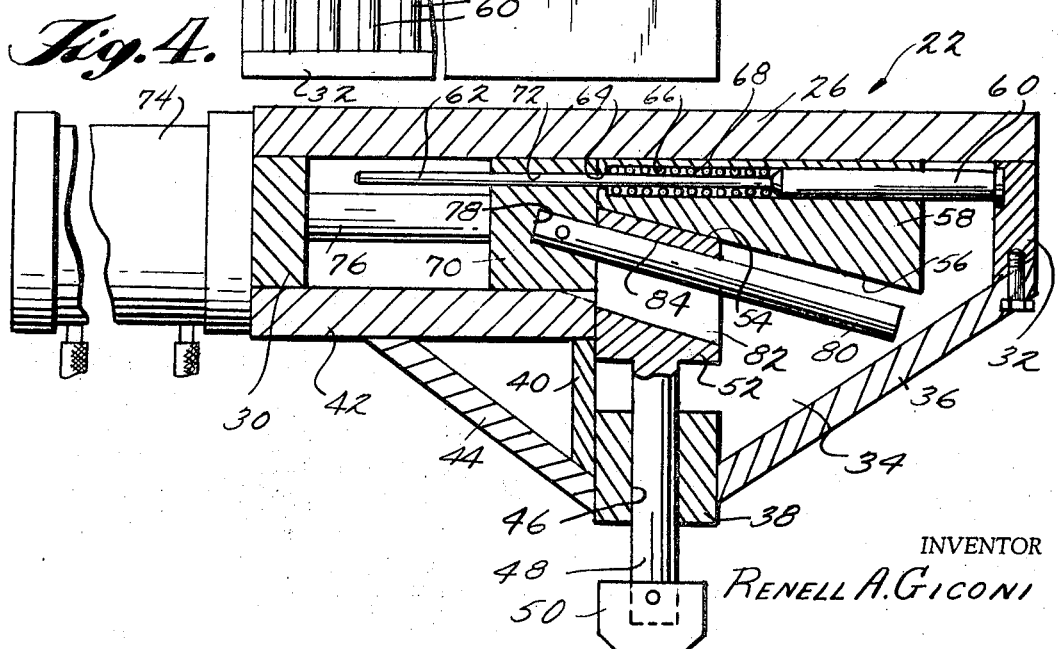
FIGURE 4 is a vertical sectional view of the upper cutting assembly, showing the position of the parts when the cutting teeth are disposed in their inoperative limiting position.

Each wedge member 58 is mounted for horizontal reciprocating movement with its upper horizontal surface in engagement with the lower surface of the horizontal frame member 26 by means of a guide rod 60 having one end fixed to the front side frame member 32 and having at its opposite end a reduced end portion 62. As shown in FIGURES 4–6 each wedge member is provided with a horizontal bore 64 of a size to receive the reduced end portion of the associated rod therethrough, each bore 64 having a counterbore 66 formed therein of a size to receive the enlarged end portion of the associated rod 60. A compression coil spring 68 is disposed within each counterbore 66 in surrounding relation with the reduced end portion 62 of the associated rod and has its ends disposed in abutting engagement respectively with the shoulder formed between the associated bore 64 and counterbore 66 and the shoulder formed between the reduced end portion and enlarged portion of the associated rod 60.

As shown in FIGURES 4–6, each coil spring 68 acts in a direction to move the associated wedge member 58 in a direction toward the left. The wedge members are moved toward the right as viewed in FIGURES 4–6 by means of an actuating member 70 extending between the end frame plates 34 and horizontally reciprocably movable between the upper frame member 26 and the bottom frame plate 42 toward and away from the side frame member 30. The actuating member 70 is provided with a series of horizontally extending parallel bores 72, each of which receives the reduced end portion 62 of one of the guide rods 60. The actuating member 70 is horizontally reciprocably moved, by any suitable means, such as a pair of horizontally spaced double acting hydraulic piston and cylinder units 74. Each of the units 74 includes a conventional piston rod 76 which extends through a suitable opening in the side frame member 30 and has its outer end fixedly connected with the actuating member 70.

Formed in the central forward portion of the actuating member 70 is a series of parallel recesses or bores 78 within which one end of a series of wedge rods 80 is fixedly attached. Each of the wedge rods 80 extends downwardly and forwardly from the actuating member 70 through a vertically elongated slot 82 formed in the central portion of the associated wedge member 52. The upper surface of each slot 82 defines a wedge surface 84 which cooperates with the upper surface of the associated wedge rod 80, the angle of inclination of these cooperating wedge surfaces being the same as the angle of inclination of the wedge surfaces 54 and 56.

Referring now more particularly to FIGURES 4–6, it will be noted that the cutting teeth 50 are mounted for independent vertical reciprocating movement between an uppermost inoperative limiting position, as shown in FIGURE 4, and a lower operative position wherein the wedge members 52 are in engagement with the upper surface of the elongated block 38. The wedge members 58 move at all times with the cutting teeth 50 (except for some very limited play that may be provided between the wedge surfaces 84 and wedge rods 80 or the wedge surfaces 54 and 56 when the actuating member 70 is in engagement with the wedge members 58). The wedge members 58 move independently with a horizontal reciprocating action between a first limiting position, as shown in FIGURE 4, which corresponds with the uppermost inoperative limiting position of the cutting teeth, and a second limiting position which corresponds with the lower operative position of the cutting teeth. The movement of the actuating member 70 is likewise a horizontal reciprocating action between a deactuating limiting position, as shown in FIGURE 4, and an actuating limiting position, as shown in FIGURE 5.

When the parts are in the position shown in FIGURE 5, the cutting teeth 50 are disposed in a position spaced above the upper surface of a stone to be cut. Actuating the cylinder and piston units 74 to move the actuating member 70 to the left, as shown in FIGURE 4 permits each wedge member 58 to move with the actuating member under the action of the associated coil spring 68. This movement of each wedge member 58 to the left, as shown in FIGURES 4 and 5, will effect a downward movement of the associated cutting teeth 50 through the cooperative action of the wedge surfaces 54 and 56. As each cutting tooth 50 engages the upper surface of the stone to be cut at its particular local position, the downward movement of the tooth is halted together with the movement of the associated wedge member under the action of the associated spring 68. However, the actuating member 70 will continue to move to the left until it reaches its actuating limiting position, as shown in FIGURE 5. Thus, during the movement of the actuating member from the position shown in FIGURE 4 to the position shown in FIGURE 5 the cutting teeth will assume different positions of engagement with the upper surface of the stone, depending upon the local condition of the upper surface of the stone, as shown in FIGURE 2.

It will be noted that each tooth is rigidly supported in an upward direction through the inter-engagement of the wedge surfaces 54 and 56 and the engagement of the wedge members 58 with the upper frame member 26. Moreover, the movement of each wedge member 58 under the action of its associated spring 68 is a rapid one and, because each associated cutting tool 50 moves with its associated wedge member, the engagement of each tooth with the upper surface of the stone to be cut is a firm engagement with the load on all of the teeth substantially equalized. In this way, the teeth 50 are extended into equalized engagement with the upper surface of the stone during the movement of the actuating member 70 toward its actuating limiting position.

The teeth 50 are retracted during the movement of the actuating member 70 toward its deactuating limiting position. As the actuating member moves to the right, as viewed in FIGURES 4–6, the upper forward surface thereof will engage the rearward surfaces of the wedge members 58 and move the wedge members therewith against the action of the springs 68. Simultaneously with or just after the engagement of the actuating member 70 with each wedge member the associated wedge rod 80 will engage the wedge surface 84 of the associated wedge member 52 of each cutting tooth 50 to effect an upward movement of the associated cutting tooth commensurate with the movement of the associated wedge member to the right, as shown in FIGURE 6. This retractive movement of the cutting teeth 50 through the action of the wedge rods 80 and wedge surfaces 84 continues until the actuating member 70 reaches its deactuating limiting position, as shown in FIGURE 4.

In accordance with the principles of the present invention, the operation of the upper cutting assembly 22 as well as the operation of the lower cutting assembly 24 (whether it be constructed similar to the assembly 22 or otherwise) is integrated with the overall operation of the machine 10 so as to provide for an automatic cutting stroke and an automatic return stroke of the machine under the control of the operator. Referring now more particularly to FIGURE 1, the power operated base moving mechanism 18 includes a pair of double acting hydraulic piston and cylinder units 86 and the stone handling feed and discharge assembly 20 includes a stop element 88 which is movable into the path of feed of a stone and out of the path of discharge of the stone through a double acting hydraulic piston and cylinder unit 90. The machine is provided with a hydraulic sump 92 and a main pump 94 which draws hydraulic fluid from the sump through a feed pipe 96 and delivers hydraulic fluid under pressure to a feed line 98. The feed line 98 is connected with a manually operable four-way valve 100 having an operating lever or button 102 which is under the manual control of the operator. The control valve 100 is of conventional four-way valve construction having a null position in which the main feed line 98 is communicated directly to a discharge line 104 which dumps into the sump 92.

When the operating lever 102 is moved to the left, as shown in FIGURE 1, the main feed line 98 is communicated with a line 106 connected in parallel respectively with the end of the piston and cylinder units 74, to move the same from their deactuating into their actuating limiting position, one end of the piston and cylinder unit 90, to move the stop element 88 from its stone engaging position to its stone discharging position, and with a sequential valve 108. The sequential valve 108 is of conventional construction and is preferably normally closed and set to open in response to a predetermined pilot hydraulic pressure. The pilot hydraulic pressure is provided from the line 106 through a parallel line 110. When the outlet of valve 108 is connected to the lower end of the piston and cylinder units 86 to effect the raising movement of the base member 16 through a line 112. The line 112 is connected in parallel with the line 106 through a branch line 114 having a check valve 116 therein which prevents flow through the branch line 116 directly from the line 106 to the line 112.

It can thus be seen that when the control lever 102 is moved to the left, as shown in FIGURE 1, pressurized hydraulic fluid from the pump 94 is delivered to the piston and cylinder units 74 and 90 to effect an extended movement of the upper teeth into engagement with the upper surface of the stone to be cut, an extended movement of the lower teeth into engagement with the lower surface of the stone to be cut, and a movement of the stop element 88 out of the path of discharge of the stone. The hydraulic fluid in the opposite end of the units 74 and 90 is returned to the sump 92 through the valve 100 and main return line 104 by means of a line 118 suitably connected in parallel to the opposite ends of the respective piston and cylinder units 74 and 90. As soon as the piston and cylinder units 74 and 90 have been moved through their entire stroke, the hydraulic pressure in line 106 increases to a value which is sufficient to move the sequencing valve, through the pilot line 110, into its open position thus communicating the hydraulic fluid under pressure in line 106 with the piston and cylinder units 86 through the line 112. The hydraulic fluid in the upper ends of the units 86 is returned to the sump through a line 120 connected in parallel with the line 118.

In this way, the cutting teeth are first moved into equalized engagement with the stone through the operation of the cutting assemblies themselves independent of any relative movement between the base member and head member of the machine. After this action has taken place the upward cutting movement of the base member automatically commences. The operator then moves the control lever 102 into its manual position to halt the upward movement of the base member 16 and the cut stone is then discharged. The machine is re-cycled by moving the control lever 102 to the right, as viewed in FIGURE 1, so as to simultaneously pressurize all of the piston and cylinder units for movement in the opposite direction.

It can thus be seen that there has been provided a stone cutting machine in which the operating cycle has been greatly simplified. The cutting stroke of the operating cycle constitutes a simple two-step sequential movement which is automatically performed simply by actuating a single control lever or button. In the first step of the cutting stroke, the teeth are extended into equalized engagement with the upper and lower surfaces of the stone. In an exemplary operation, the cutting teeth in this step may have a maximum total movement of one inch. Because of the positive engagement of the cutting teeth with the surfaces of the stone during this operation, as aforesaid, a subsequent upward movement of the base member 16 of approximately one-half inch is usually sufficient to effect the cut.

During the return stroke of the machine, the cutting teeth are retracted simultaneously with the downward movement of the base member. With this arrangement, there is provided an optimum operating cycle which materially reduces the time of the cycle and hence permits a maximum productive capacity. For example, a machine constructed in accordance with the principles of the present invention is capable of making 35 to 48 cuts per minute, which is approximately two to four times the productive capacity of prior art machines.

Referring now more particularly to FIGURES 7 and 8, there is shown therein an upper cutting assembly 100 of modified form embodying the principles of the present invention. It will be understood that the cutting assembly 100 may be utilized in lieu of the upper cutting assembly 22 previously described and/or in lieu of the lower cutting assembly 24 previously described. The assembly 100 includes a main, generally trough-shaped frame section 102 providing opposed side walls 104 and 106 and a U-shaped depending portion 108 in the central bottom portion thereof. The U-shaped portion 108 is provided with a series of parallel openings 110 within which a series of cutting teeth shanks 112 are mounted for vertical reciprocation. The outwardly extending end of each shank 112 is provided with a cutting tooth 114 which, as shown, forms an integral part of the shank, although it will be understood that the tooth may be formed separately and suitably pinned or otherwise secured to the shank, if desired. In order to maintain the interior working parts of the cutting assembly relatively clean, an annular seal 116 is provided within each opening 110 in engagement with the associated shank 112.

Fixed to the upper end of each shank 112 is a wedge member 118 having an upper wedge surface 120 which is adapted to engage a cooperating wedge surface 122 formed on the lower portion of a cooperating wedge member 124. The angle of inclination of the wedge surfaces 120 and 122 are similar to the wedge surfaces 54 and 56 previously described.

Each wedge member 124 is mounted for horizontal reciprocating movement with its upper horizontal surface in engagement with the lower surface of a horizontal frame member 126 secured to the upper edges of the end walls 104 and 106 of the main frame member 102. As best shown in FIGURE 7, the frame, which is box-like in overall configuration, is completed by securing a pair of end plates 127 to the ends of the main frame section 102 thereby providing an enclosed interior which is maintained free from dust and other particles that may be created as a result of the operation of the machine.

Each wedge member 124 is guided during its reciprocatory movement by a guide rod 128 which extends through an elongated opening or bore 130 formed in the associated wedge member 124. One end of each guide rod 128 is formed with an enlarged head which is adapted to seat within a cooperating recess formed in a rod retaining strip 132 fixedly engaged in the upper interior portion of the end wall 104. Disposed in surrounding relation to each rod 128 between the retaining strip 132 and the adjacent end of the associated wedge member 124 is a helical compression spring 134 which acts in a manner similar to the spring 68 previously described.

As before, an elongated actuating member 136 is disposed within the main frame section 102 adjacent the end wall 106 for horizontal reciprocatory movement therein. The actuating member 136 is provided with openings 138 for receiving the adjacent ends of the guide rods 128 and includes an inwardly facing vertical surface 140 adapted to abuttingly engage outwardly facing vertical surfaces 142 formed on the ends of the wedge members 124.

The actuating member 136 is reciprocated by a pair of hydraulic rams 144 the cylinders of which are secured to the exterior of the end wall 106 adjacent the ends thereof and the piston rod of which are rigidly secured to the actuating member. The hydraulic rams 144 operate in a manner similar to the rams 74 previously described.

The U-shaped frame portion 108 is formed with a pair of interior circular recesses 146 on opposite sides of each opening 110 for receiving one end of a pair of helical coil springs 148. The opposite ends of each pair of coil springs 148 seat within circular recesses 150 formed in the associated wedge member 118 so as to resiliently bias the associated cutting tooth into a retracted position.

The operation of the cutting assembly 100 is the same as the cutting assembly 22 previously described and it functions in the overall operation of the machine in the same manner. However, it will be noted that during the return stroke of the hydraulic rams 144, the cutting teeth 114 will be moved into their retracted position by the operation of the helical compression springs 148 rather than by engagement of the wedge rod carried by the actuating member, such as the wedge rod 80 previously described, cooperating with a wedge surface, such as the wedge surface 84 previously described.

It thus will be seen that the objects of this invention have been fully and effectively accomplished. It will be realized, however, that the foregoing specific embodiments have been shown and described only for the purpose of illustrating the principles of this invention and is subject to extensive change without departure from such principles. Therefore, this invention includes all modifications encompassed within the spirit and scope of the following claims.

What is claimed is:

1. A stone cutting machine comprising a base member, a lower cutting assembly carried by said base member including a series of upwardly facing lower cutting teeth disposed in side-by-side relation, means mounting said lower cutting teeth for independent vertical movement between a lowermost retracted position and extended position rigid with respect to said base member in a downward direction in which the extended position of each lower cutting tooth is dependent upon its local engagement with the lower surface of a stone to be cut, and lower power operated means carried by said base member for effecting a movement of said lower cutting teeth from said retracted position into said extended positions, a head member, means mounting said head member and said base member for relative movement toward and away from each other, an upper cutting assembly carried by said head member including a series of downwardly facing upper cutting teeth disposed in side-by-side relation in general vertical alignment with said lower cutting teeth, means mounting said upper cutting teeth for independent vertical movement between an uppermost retracted position and extended positions, a corresponding series of wedge members mounted in side-by-side relation for independent horizontal movement between inoperative and operative limiting positions, wedge guide means extending through the wedge members, spring means mounted on the guide means resiliently urging each of said wedge members toward said operative limiting position, each of said wedge members including an abutment surface facing in a direction toward said operative limiting position, an elongated actuating member extending transverse to the direction of movement of said wedge members and mounted for movement in the direction of movement of said wedge members between an actuating limiting position and a deactuating limiting position, said elongated member including an abutment surface facing in a direction opposed to the abutment surfaces of said wedge members, upper power operated means for effecting movement of said actuating member between the limiting positions thereof so that when said actuating member is moved into said deactuating limiting position the abutment surface of said elongated member engages the opposed abutment surfaces of said wedge members and maintains said wedge members in said inoperative limiting position against the action of said spring means and movement of said actuating member from said deactuating limiting position toward said actuating limiting position permits movement of said wedge members from said inoperative position toward said operative position under the action of said spring means, cooperating wedge surface means between each wedge member and a corresponding upper cutting tooth for effecting vertical movement of said upper cutting teeth in a direction toward said extended position and for preventing movement of said wedge members in a direction toward said inoperative limiting position in response to upward forces applied to said upper cutting teeth, and means operatively connected with each upper cutting tooth for effecting movement of said upper cutting teeth in a direction toward said retracted position in response to the movement of said wedge members toward said inoperative limiting position by said actuating member, and third power operated means for effecting a relative movement between said base member and said head member toward each other when said cutting teeth are disposed in said extended positions to effect the cutting of a stone engaged therebetween and away from each other after the cutting of the stone is completed.

2. A stone cutting machine as defined in claim 1 including means for operating said power operated means including manual control means movable into first and second positions, and means operable in response to the movement of said manual control means into said first position for automatically sequentially operating said upper and lower power operated means to effect movement of the associated cutting teeth into said extended positions and then said third power operated means to effect the relative movement between said base member and said head member toward each other to cut the stone after said cutting teeth have been moved into said extended positions.

3. A stone cutting machine as defined in claim 2 wherein said means for operating said power operated means further includes means operable in response to the movement of said manual control means into said second position for simultaneously operating all of said power operated means to effect movement of said cutting teeth into said retracted positions and the relative movement between said base member and said head member away from each other.

4. A stone cutting assembly for a stone cutting machine comprising a series of cutting teeth mounted in side-by-side relation for independent vertical movement between a retracted limit position and an extended limit position, a corresponding series of wedge members mounted in side-by-side relation for independent horizontal movement between inoperative and operative limiting positions, wedge guide means extending through the wedge members, spring means mounted on the guide means resiliently urging each of said wedge members toward said operative limiting position, each of said wedge members including an abutment surface facing in a direction toward said operative limiting position, an elongated actuating member extending transverse to the direction of movement of said wedge members and mounted for movement in the direction of movement of said wedge members between an actuating limiting position and a deactuating limiting position, said elongated member including an abutment surface facing in a direction opposed to the abutment surfaces of said wedge members, power operated means for effecting movement of said actuating member between the limiting positions thereof so that when said actuating member is moved into said deactuating limiting position the abutment surface of said elongated member engages the opposed abutment surfaces of said wedge members and maintain said wedge members in said inoperative limiting position against the action of said spring means and movement of said actuating member from said deactuating limiting position toward said actuating limiting position permits movement of said wedge members along said guide means from said inoperative position toward said operative position under the action of said spring means, cooperating wedge surface means between each wedge member and a corresponding cutting tooth for effecting movement of said cutting teeth in a direction toward said extended position in response to the movement of the corresponding wedge members in a direction toward said operative limiting position and for preventing movement of said wedge members in a direction toward said inoperative limiting position in respense to forces applied to said cutting teeth tending to move the same toward said retracted position, and means operatively connected with each cutting tooth for effecting movement of said cutting teeth in a direction toward said retracted limting position in response to the movement of said wedge members toward said inoperative limiting position by said actuating member.

5. A stone cutting assembly as defined in claim 4 including a generally box-like frame providing an enclosure receiving said wedge members, said spring means and said actuating member, said cutting teeth including shanks slidably engaged within openings in said frame and extending outwardly thereof.

6. A stone cutting assembly as defined in claim 5 wherein said means for effecting movement of said cutting teeth in a direction toward said retracted limit position comprises spring means operatively connected between said frame and said cutting teeth resiliently urging said cutting teeth toward said retracted position.

7. A stone cutting assembly as defined in claim 4 wherein said means for effecting movement of said cutting teeth in a direction toward said retracted limit position comprises a wedge rod associated with each cutting tooth fixed at one end with said actuating member and extending outwardly therefrom at an inclination equal to the angle of inclination of the associated cooperating wedge surface means, and means defining a slot associated with each cutting tooth elongated in the direction of movement of said cutting tooth, each slot defining means providing an inclined surface for engaging the associated wedge rod.

8. A stone cutting assembly for a stone cutting machine comprising a frame, a series of cutting teeth, means for mounting said cutting teeth on said frame in side-by-side relation for independent movement between a retracted limit position and an extended limit position, a corresponding series of wedge members, means mounting said wedge members on said frame in side-by-side relation for independent movement between inoperative and operative limiting positions, said means mounting said wedge members on said frame comprising a plurality of horizontally extending guide rods fixed at one end to said frame, each of said guide rods including a reduced end portion, each of said wedge members including a bore slidably receiving the reduced end portion of the associated guide rod, and a counterbore formed in one end portion of said bore, spring means resiliently urging each of said wedge members toward said operative limiting position, said spring means including a coil spring disposed in surrounding relation to the reduced end portion of each guide rod and operatively connected between the inner extremity of the reduced end portion of the associated guide rod, means defining cooperating wedge surfaces on each wedge member and cooperating cutting tooth for effecting a movement of said cutting teeth in a direction toward said extended position in response to the movement of the corresponding wedge members in a direction toward said operative limiting position under the action of said spring means and for preventing movement of said wedge members in a direction toward said inoperative limiting position against the action of said spring means in response to forces applied to said cutting teeth tending to move the same toward said retracted position, power driven means carried by said frame movable between an actuating limiting position and a deactuating limiting position, said power driven means including an elongated actuating member extending transversely with respect to said wedge members, lost motion connection means between each cooperating wedge member and said power driven means for effecting movement of said wedge members in a direction toward said inoperative limiting position against the action of said spring means in response to the movement of said power driven means toward said deactuating limiting position and for permitting movement of said wedge members toward said operative limiting position through the action of said spring means and hence the corresponding cutting teeth in a direction toward said extended limit position in response to the movement of said power driven means toward said actuating limiting position, means defining second wedge surfaces on said cutting teeth disposed in parallel oppositely facing relation with respect to the first mentioned wedge surfaces on said cutting teeth, and means defining cooperating second wedge surfaces engaging said second wedge surfaces on said cutting teeth for effecting movement of said cutting teeth in a direction toward said retracted limit position in response to the movement of said wedge members toward said inoperative limiting position, said means defining said cooperating second wedge surfaces including a series of wedge rods secured to said actuating member and extending through vertically elongated slots formed in said cutting teeth, the upper surfaces of said slots constituting said means defining said second wedge surfaces.

References Cited

UNITED STATES PATENTS

| | | | |
|---|---|---|---|
| 2,258,466 | 10/1941 | Naylor | 269—24 X |
| 2,544,499 | 3/1951 | Hovey | 269—24 X |
| 2,552,958 | 5/1951 | Graham | 125—23 |
| 2,762,359 | 9/1956 | Entz | 125—23 |
| 2,768,620 | 10/1956 | Jenkins | 125—23 |
| 2,798,475 | 7/1957 | Van Hoose | 125—23 |
| 2,888,915 | 6/1959 | Entz | 125—23 |
| 2,933,079 | 4/1960 | Gutting | 125—23 |

HAROLD D. WHITEHEAD, *Primary Examiner.*